March 27, 1956 C. L. VICE 2,739,489
HELICAL GEAR DRIVE AND CALIBRATING MECHANISM OR THE LIKE
Filed April 26, 1955
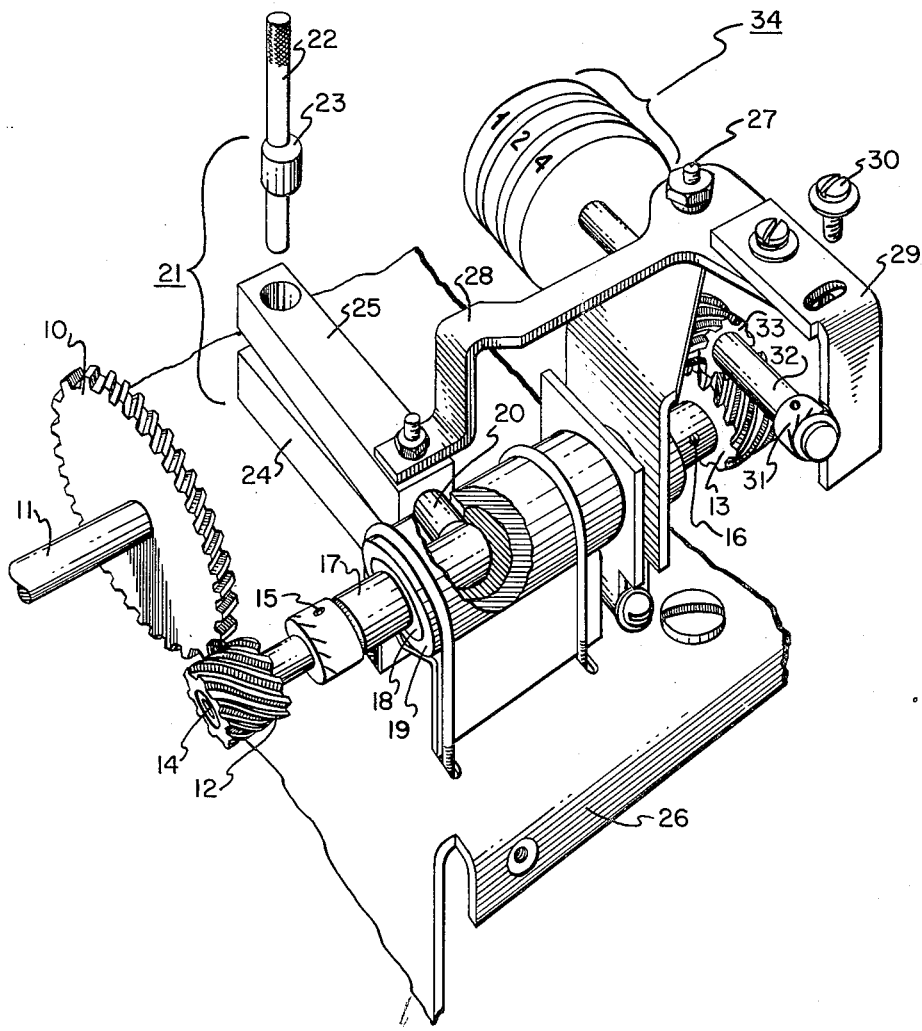
CHARLES L. VICE
*INVENTOR.*
BY
HIS ATTORNEY

United States Patent Office 2,739,489
Patented Mar. 27, 1956

2,739,489

HELICAL GEAR DRIVE AND CALIBRATING MECHANISM OR THE LIKE

Charles L. Vice, San Marino, Calif., assignor to Hoffman Electronics Corporation, a corporation of California Application April 26, 1955, Serial No. 503,899

6 Claims. (Cl. 74—395)

This invention is related to fiducial correction mechanisms in which the fiducial or reference disposition of a rotatable shaft, for example, is adjustable, and more particularly to an improved fiducial correction mechanism which is reliable, compact, of relatively simple design, and capable of adjustment of high accuracy.

In the past, many types of fiducial correction or calibrating mechanisms have been devised. Many of the correction mechanisms currently in use are deficient in some respects. The principal difficulties which inhere in current designs are reliability which is less than desired, bulkiness, complexity of design, and incapability in permitting adjustment with any degree of precision.

Therefore, it is an object of the present invention to provide a new and useful fiducial correction mechanism.

It is a further object of the present invention to provide a new and useful fiducial correction mechanism which will be of relatively simple design, highly reliable, and capable of adjustment with high precision.

According to the present invention, a fiducial shaft is coupled to and driven by an adjustable shaft through two 45° helical gear sets. The two innermost helical gears are mounted upon a common shaft which is disposed within a shaft housing. This shaft housing is in turn slidably disposed within a second housing having a side aperture adapted to receive an eccentric lock pin associated with an eccentric lock. When the eccentric lock is disposed in its unlocked condition, the first shaft housing will be free to slide within the second housing upon the rotation of the adjustable shaft, by reason of the fact that in the unlocked condition a friction lock will be imposed upon the fiducial shaft by means of a lever arm mechanically coupled to the eccentric lock. The two innermost 45° helical gears will be designed to maintain engagement of their respective cooperating gears despite considerable displacement of the shaft housing within the aforementioned second housing. Thus, the adjustable shaft may be rotated without endangering the rotation of the fiducial shaft until the proper angular relationship between the adjustable shaft and the fiducial shaft exists. At this point the eccentric lock is actuated in the direction of the lock position, which actuation fixedly determines the longitudinal disposition of the shaft housing within the second housing and which, simultaneously, frees the fiducial shaft from the lever friction lock previously imposed. In this final locked condition, the fiducial shaft may be driven by the rotation of the adjustable shaft, as before the fiducial adjustment was made.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing, in which:

The sole figure is a partially exploded, perspective view of a fiducial correction mechanism according to the present invention.

In the sole figure, helical gear 10 is mounted upon adjustable shaft 11 and cooperates with helical gear 12. Helical gears 12 and 13 are each coaxially mounted upon shaft 14 by means of set screws 15 and 16. Shaft 14 is disposed within slidable housing 17, manufactured so as to have an internal bearing surface. Surrounding slidable housing 17 is oil-impregnated bearing 18 which is press fitted into housing 19. As may be seen in the sole figure, slidable housing 17 in the absence of other forces acting thereupon is free to slide to a considerable degree along the surface of bearing 18 mounted within housing 19. Housing 19 has a side aperture adapted to receive pin 20 of eccentric lock 21. Eccentric lock 21 is shown to consist of adjustable shaft 22 having eccentric portion 23, shaft guide element 24, and locking arm 25 which is provided with lock pin 20. Housing 19 and shaft guide element 24 of eccentric lock 21 are fixedly disposed to each other and securely attached to support structure 26. Screw 27 serves as a pivot for pivot arm 28 which is affixed to locking arm 25 of eccentric lock 21. To pivot arm 28 is attached stop arm 29, the combination of pivot arm 28 and stop arm 29 being provided with an adjustment screw 30. Stop arm 29 is contoured to cooperate with collar 31 which is mounted upon fiducial shaft 32, the combination of stop arm 29 and collar 31 forming a suitable friction lock for shaft 32. Helical gear 33 is also mounted upon shaft 32 and is adapted to cooperate with helical gear 13. In the embodiment of the present invention shown in the sole figure, shaft 32 is intercoupled with a dial counter, namely dial counter 34.

The fiducial correction mechanism shown in the sole figure operates as follows. Let it be assumed that it is desired to adjust the angular disposition of shaft 11 with respect to the angular disposition of shaft 32. For purposes of illustration, let it also be assumed that dial counter 34 is intended to be a frequency indication in kilocycles of an oscillator the tuning element of which is mechanically coupled to shaft 11. Suppose that it is an object to tune the oscillator to 124 kilocycles as is depicted by dial counter 34. In such a case, eccentric lock 21 would be disposed in its unlocked position by means of the operator rotating shaft 22 in a clockwise direction. By such rotation of shaft 22 pin 20 would be removed from contact with slidable housing 17. In addition, pivot arm 28 would rotate about the axis described by screw 27, causing arm 29 to come in contact with collar 31 to form a friction lock therewith. By this friction lock shaft 32 will be precluded from rotating, despite any rotation of shaft 11. At this point the tuning element of the oscillator which is intercoupled with shaft 11 may be adjusted for the desired frequency, e. g., 124 kilocycles. Note however that the rotation of shaft 11 produced by such adjustment is unaccompanied by the rotation of fiducial shaft 32, by reason of the friction lock imposed by the cooperation of stop arm 29 and collar 31; rather, by reason of the fixed disposition of 45° helical gear 33, housing 17 will slide within the bearing surface of housing 19 according to the rotation of tuning shaft 11. It is to be noted that by reason of the ample thickness of 45° helical gears 12 and 13 tuning shaft 11 may be rotated a considerable amount without endangering the disengagement of the two 45° helical gear sets. When the adjustment is completed, eccentric lock shaft 22 is turned counter-clockwise to again lock slidable housing 17 in a permanent disposition with respect to outer housing 19. Upon such locking, by virtue of the motion of pivot arms 28 and 29 about screw 27, the friction lock created by collar 31 and arm 29 will terminate so as to permit the rotation of fiducial shaft 32 with the rotation of tuning shaft 11.

It may be noted in passing that the approximate clearance between slidable housing 17 and oil-impregnated bearing 18, to be most satisfactory, will be about 1/1000 of an inch. Pin 20 of eccentric lock 21 may be contoured to engage slidable housing 17, if desired.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A fiducial correction mechanism including, in combination, a first shaft, a first 45° helical gear mounted upon said first shaft, a second shaft, a second 45° helical gear mounted upon said second shaft and adapted to cooperate with said first helical gear, a third 45° helical gear mounted upon said second shaft, a third shaft, a fourth 45° helical gear mounted upon said third shaft and adapted to cooperate with said third helical gear, means for constraining the displacement of said second shaft to translation in an axial direction, and means for alternatively locking in place and releasing simultaneously or releasing and locking simultaneously said second shaft and said third shaft, respectively.

2. Apparatus according to claim 1 in which said displacement constraining means comprises a first housing having inner bearing means adapted to receive said second shaft, and a second housing having bearing means adapted to receive said first housing to permit the translation in an axial direction thereof.

3. Apparatus according to claim 2 in which said alternative locking and releasing means comprises means for applying a friction lock to said third shaft, means for applying a friction lock to said first housing, both of said friction locking means being mechanically intercoupled.

4. Apparatus according to claim 2 in which said second housing is provided with a side aperture, an eccentric lock having a lock pin portion adapted to enter said side aperture of said second housing and thereby engage said first housing, lever arm means coupled to said eccentric lock, rotatable about a fixed axis, and adapted to engage said third shaft for applying a friction lock thereto.

5. Apparatus according to claim 4 in which said lever arm means comprises a first L-shaped lever arm element having a pivot mounting hole and an attachment hole, a second L-shaped lever arm element having a slotted hole, screw means passing through said slotted and attachment holes for mounting said second lever arm element to said firts lever arm element.

6. Apparatus according to claim 5 in which said third shaft is provided with a friction lock collar.

No references cited.